United States Patent
Wals et al.

(10) Patent No.: US 6,449,236 B2
(45) Date of Patent: Sep. 10, 2002

(54) OPTICAL WAVEFRONT MODIFIER

(75) Inventors: Jeroen Wals; Joris Jan Vrehen; Sjoerd Stallinga, all of Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

(21) Appl. No.: 09/745,939

(22) Filed: Dec. 22, 2000

(30) Foreign Application Priority Data

Dec. 24, 1999 (EP) .............................. 99204525

(51) Int. Cl.[7] ................................. G11B 7/00
(52) U.S. Cl. ............... 369/112.02; 369/44.32; 369/44.23
(58) Field of Search .................. 359/254; 250/201.1, 250/201.9, 201.5; 369/44.11–44.42, 112.02

(56) References Cited

U.S. PATENT DOCUMENTS 6,125,088 A * 9/2000 Ogasawara ............. 369/44.32
6,130,418 A * 10/2000 Van Rosmalen et al. 250/201.5
6,141,304 A * 10/2000 Ogasawara ............. 369/44.32
6,198,462 B1 * 3/2001 Furukawa et al. ............ 345/94

FOREIGN PATENT DOCUMENTS

EP          0745980         12/1996

* cited by examiner

Primary Examiner—Hung Xuan Dang
Assistant Examiner—Tuyen Tra
(74) Attorney, Agent, or Firm—Michael E. Belk

(57) ABSTRACT

An optical wavefront modifier modifies a wavefront of an optical beam passing through the modifier. The modifier comprises a first and a second transparent electrode layer and a flat medium for modifying the wavefront depending on electrical excitation of the medium and arranged between the electrode layers. The electrode layers are provide the electrical excitation to produce a first wavefront modification of a first order of a radius in the cross-section of the beam in the plane of the medium and simultaneously produce a second wavefront modification of a second order of the radius different from the first order.

19 Claims, 9 Drawing Sheets

OPTICAL WAVEFRONT MODIFIER

The invention relates to an optical wavefront modifier for modifying a wavefront of an optical beam passing through the modifier, the modifier comprising a first and a second transparent electrode layer and a medium for modifying the wavefront in dependence on electrical excitation of the medium and arranged between the electrode layers, the beam having a cross-section in the plane of the medium. The invention also relates to a device for scanning an optical record carrier having an information layer.

An optical wavefront modifier is used to change the shape of the wavefront of a radiation beam by introducing path length differences in dependence on the position in the cross-section of the beam. It may be used to change properties of an optical beam such as its vergence by introducing a focus curvature in the wavefront of the beam or to change the direction of the beam by introducing tilt. A wavefront modifier may also operate as a wavefront compensator for compensating an undesired shape of the wavefront of an optical beam, e.g. for removing spherical aberration or coma from a wavefront.

European Patent Application No. 0 745 980 shows an optical scanning device provided with a wavefront modifier used as a tilt compensator. The wavefront compensator is an electrostriction device arranged in the optical path between the radiation source and the objective system. It comprises two electrode layers on each side of an electrostrictive medium. One of the electrode layers comprises three transparent electrodes, each of which covers part of the cross-section of the beam in the plane of the medium. The other electrode layer consists of single transparent electrode covering the entire cross-section of the beam. The wavefront modifier is used to introduce coma in the radiation beam in order to compensate the coma caused by tilt of the record carrier being scanned by the optical scanning device. It is a disadvantage of the known wavefront modifier the aberration compensation does not operate properly when the radiation beam is following a track on the record carrier.

It is an object of the invention to provide a wavefront modifier which provides a good aberration compensation independent of the tracking of the focus.

This object is achieved if, according to the invention, the electrode layers of the wavefront modifier are adapted to impress a first wavefront modification of a first order of a radius in the cross-section and simultaneously a second wavefront modification of a second order of the radius different from the first order. The invention is based on the insight that a first wavefront modification, which is centred on the optical axis of the radiation beam causes other wavefront modifications in the radiation beam when the objective system is displaced from its centred position in a transverse direction when following a track. The other modifications have a radial order different from that of the first modification. In general, the introduction of a first modification in a displaced radiation beam requires the introduction of the first modification and other modifications of different radial order in the not-displaced radiation beam. The wavefront modifier according to the invention introduces the first modification and at least one other modification in the radiation beam. The wavefront modifications are centred on the axis of the radiation beam, unless otherwise stated.

The mathematical function describing spherical aberration has a radial order of four, coma of three, astigmatism and defocus of two and wavefront tilt of one.

The wavefront modifications may be introduced as a decentred first modification or as a combination of a centred first modification and a centred second modification. When introduced as a first and a second modification, the first electrode layer preferably comprises an electrode configuration for effecting the first wavefront modification and the second electrode layer comprises an electrode configuration for independently effecting the second wavefront modification. Alternatively, the electrode configuration of one electrode layer may be adapted to effect independently both the first and second modification. The independent control of the first and second modification allows a compensation of a variable amount of displacement of the radiation beam.

When the wavefront modification is introduced as a decentred modification, the electrode configuration of one electrode layer may be adapted to effect the modification. The amount of decentring of the configuration is preferably substantially equal to the displacement of the radiation beam, i.e. equal to the displacement of the objective system. The electrode configuration may be relatively simple. An off-centre modification may be described as a linear combination of a first modification of the same type as the off-centre modification but centred on the optical axis and a centred second modification of a lower radial order than the first modification. This can be explained as follows. The second modification is the difference between the off-centre modification and the same centred modification. For a small decentring, the second modification is proportional to the derivative of the modification in the radial direction of the decentring. In this case the radial order of the second modification is at least one order lower than that of the first modification.

In a special embodiment the wavefront modifier operates as an aberration compensator, correcting an undesired aberration in a radiation beam. When the modifier introduces a decentred aberration, the amount of the aberration may be controlled by the output signal of an aberration detector for measuring the aberration in the radiation beam and the amount of decentring may be controlled by the output of a position detector for measuring the displacement of the radiation beam. Alternatively, the amount of the decentred first aberration is controlled by a combination of the output signals of the aberration detector and the position detector, the magnitude of the decentring being fixed, and the sign of the decentring is controlled by the sign of the output signal of the position detector. When the modifier introduces a centred first and second aberration, the amount of the first aberration may be controlled by the output signal of the aberration detector and the amount of the second aberration by the output signal of the position detector.

The aberration detector may be a tilt detector for detecting tilt of the record carrier, and the aberration compensator introduces coma as a first aberration in the radiation beam, which compensates the coma caused by the tilt. The astigmatism caused by the off-centre objective system is preferably compensated by astigmatism introduced as a second aberration by the aberration compensator.

In a preferred embodiment, the wavefront modifier introduces coma and astigmatism by means of two similar, transversely displaced electrode configuration. Each of these structures introduces coma in the radiation beam. Since the coma of each configuration is off-centre, it can be described as a combination of centred coma and astigmatism. If the objective system is off-centre in one direction, one set of electrode structures will be energised; when the objective system is offset in the opposite direction, the other set of electrodes will be energised.

In a special embodiment the wavefront modifier comprises a series of strip electrodes in a symmetrical arrangement. The strips may have a curved shape. Any combination of aberrations may be obtained by setting each of the strips at a specific voltage. In a preferred embodiment the voltages are formed by a series arrangement of resistors having taps the strip electrodes being connected to the taps. The desired voltage distribution over the strips can be achieved by setting the voltage at the end taps and at least one intermediate tap. The electrode structure is preferably etched in a transparent conductive layer. The same conductive layer may be used to form the series arrangement of resistors.

The first and second wavefront modifications are preferably orthogonal over the cross-section of the radiation beam to ensure that the first and second modification do not affect each other, thereby improving the independence of the control of the modifications.

A further aspect of the invention relates to a device for scanning an optical record carrier having an information layer, comprising a radiation source for generating a radiation beam, an objective system for converging the radiation beam to a focus on the information layer, and a detection system for intercepting radiation from the record carrier, characterized in that an optical wavefront modifier according to any of the preceding claims is arranged in the optical path between the radiation source and the detection system.

The objects, advantages and features of the invention will be apparent from the following more particular description of preferred embodiments of the invention, as illustrated in the accompanying drawings, in which FIG. 1 shows a scanning device according to the invention;

Figure 4A:
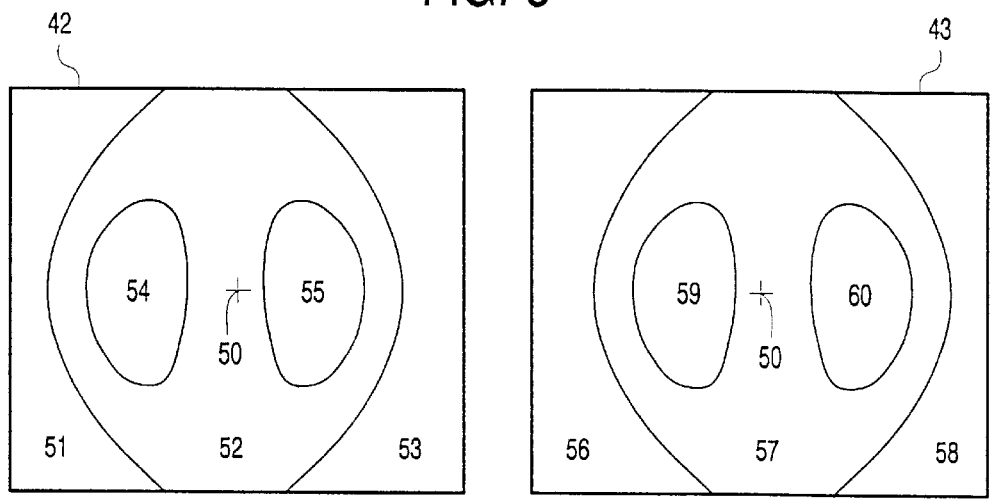
FIG. 4A shows an electrode configuration for introducing decentred coma.
Figure 6A:
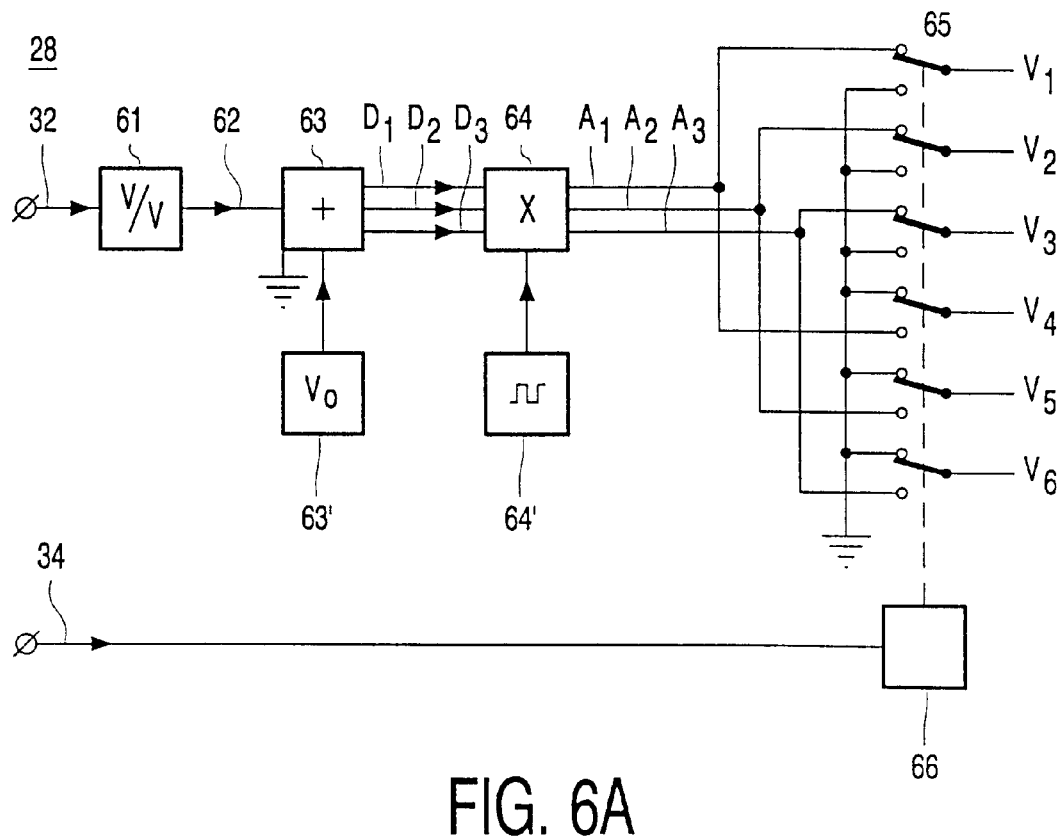
Figure 7:
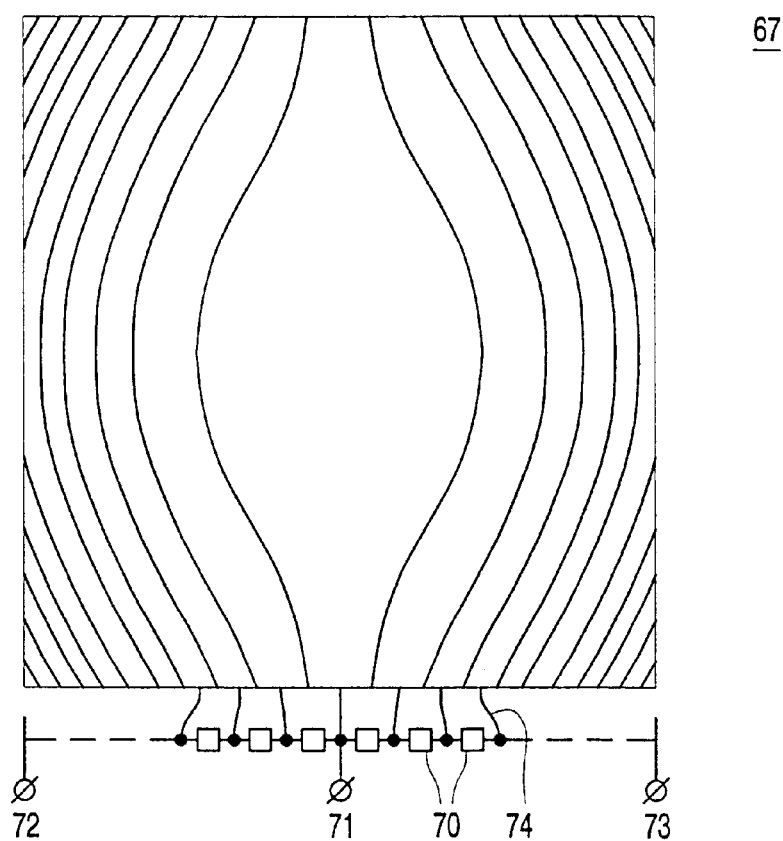
Figure 8A:
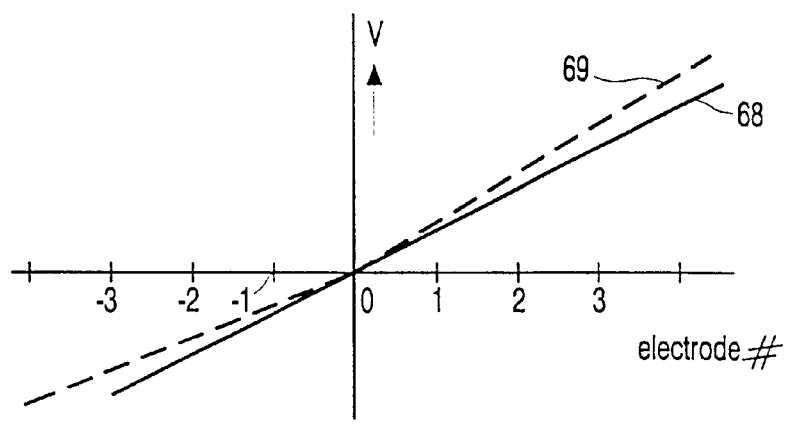
Figure 8B:
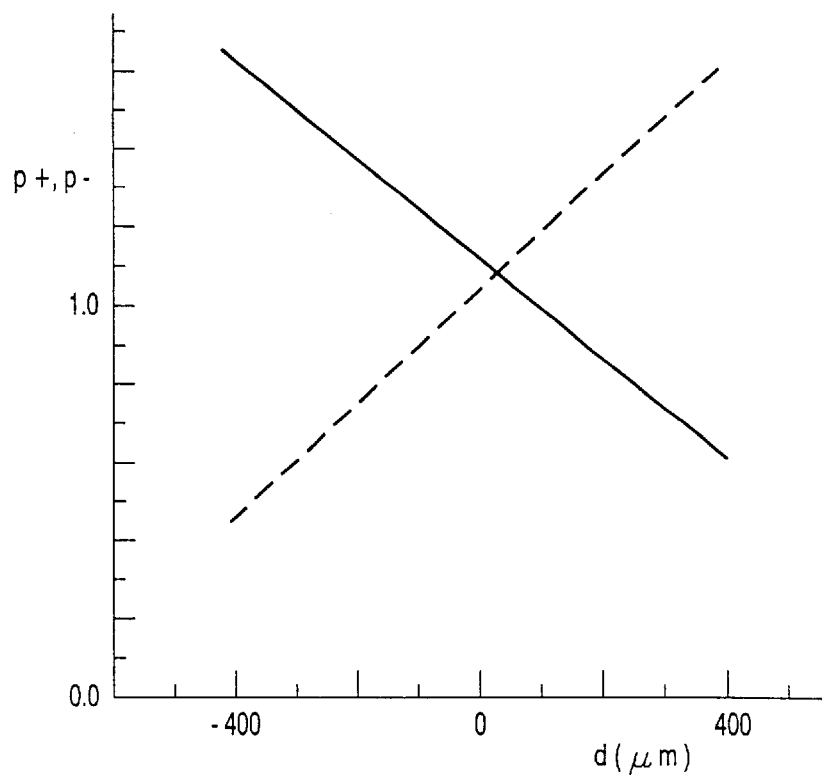
Figure 9:
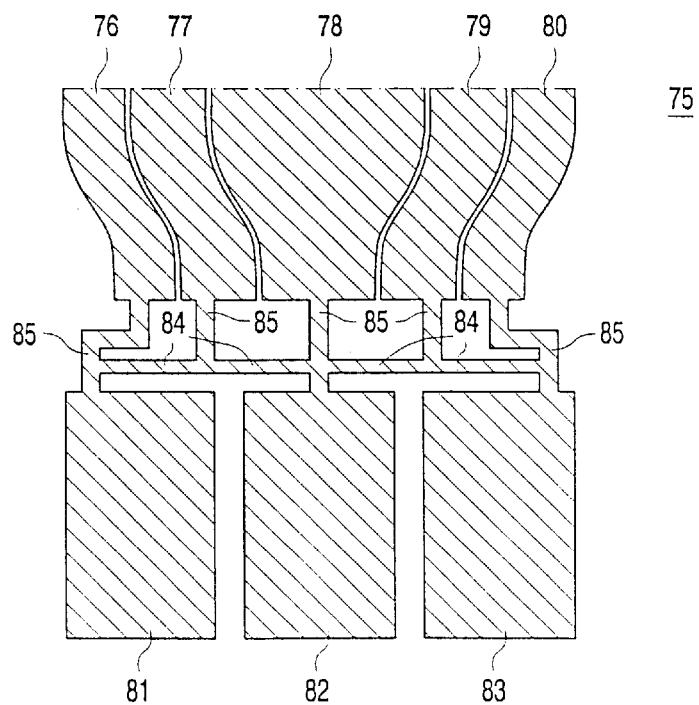
Figure 10:
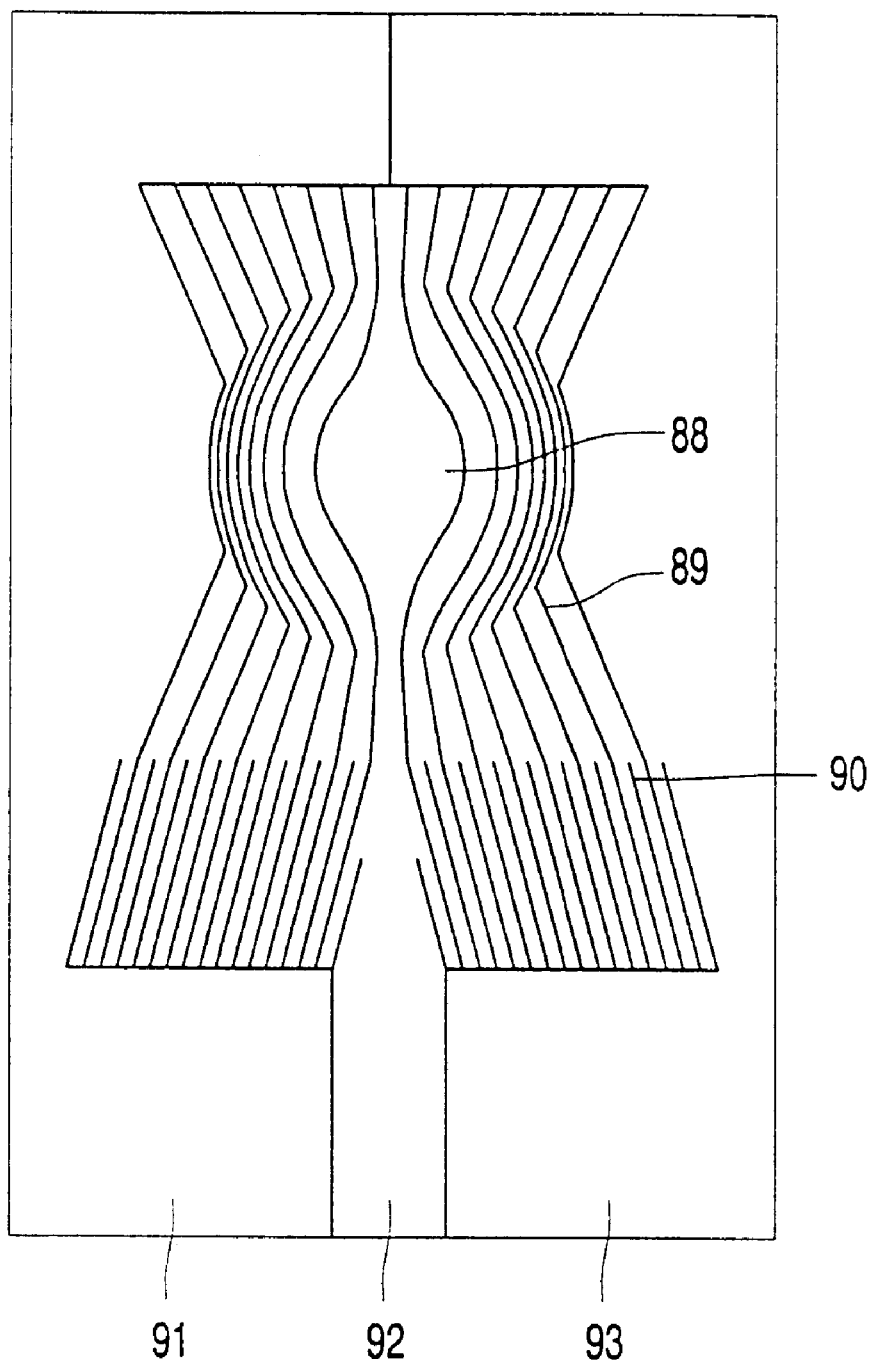
Figure 11:
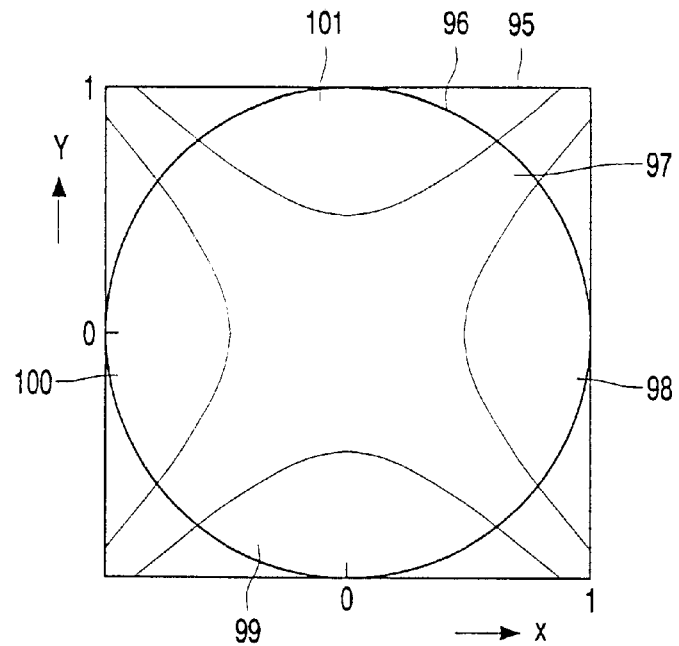
Figure 12:
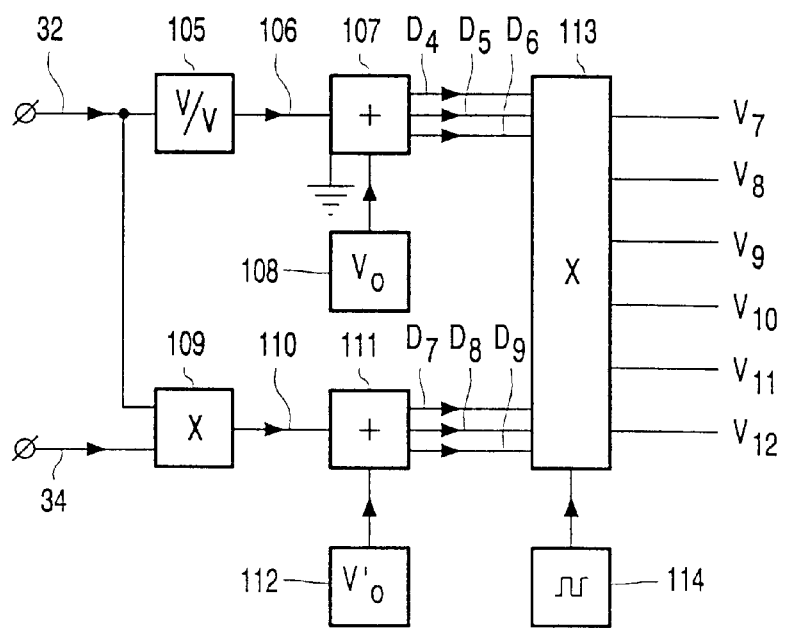
Figure 13:
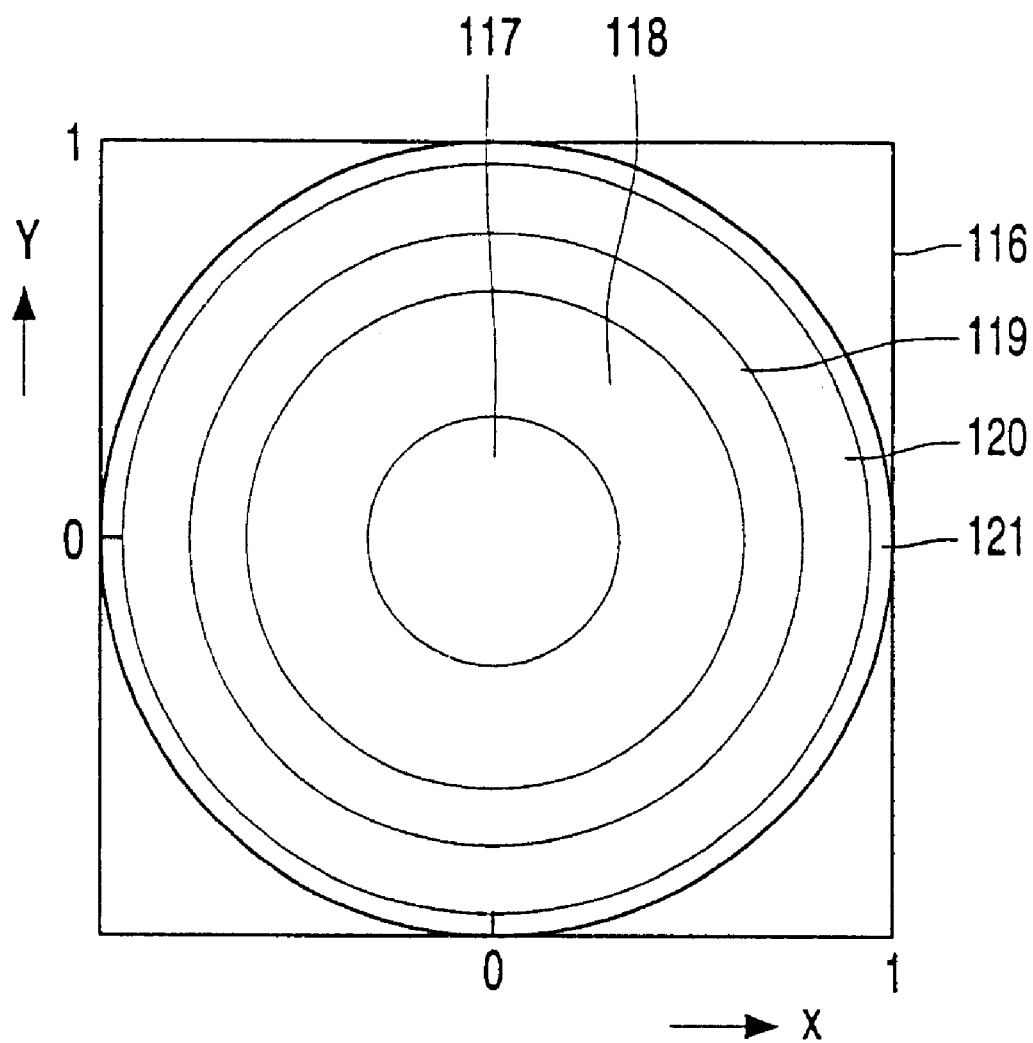

FIGS. 6A and B show two embodiments of a control circuit for the electrode configurations of FIG. 4A;

FIG. 7 shows an electrode configuration for introducing decentred coma;

FIG. 8A shows the value of the control voltages on the electrodes in the configuration of FIG. 7;

FIG. 8B shows the dependence of the asymmetry factors $p_+$ and $p_-$ on the displacement of the objective system;

FIGS. 9 and 10 show a series arrangement of resistors connecting electrodes in an electrode configuration;

FIG. 11 shows an electrode configuration for introducing centred astigmatism;

FIG. 12 shows a control circuit for an aberration compensator having electrode configurations for both coma and astigmatism; and FIG. 13 shows an electrode configuration for introducing spherical aberration.

Figure 1:
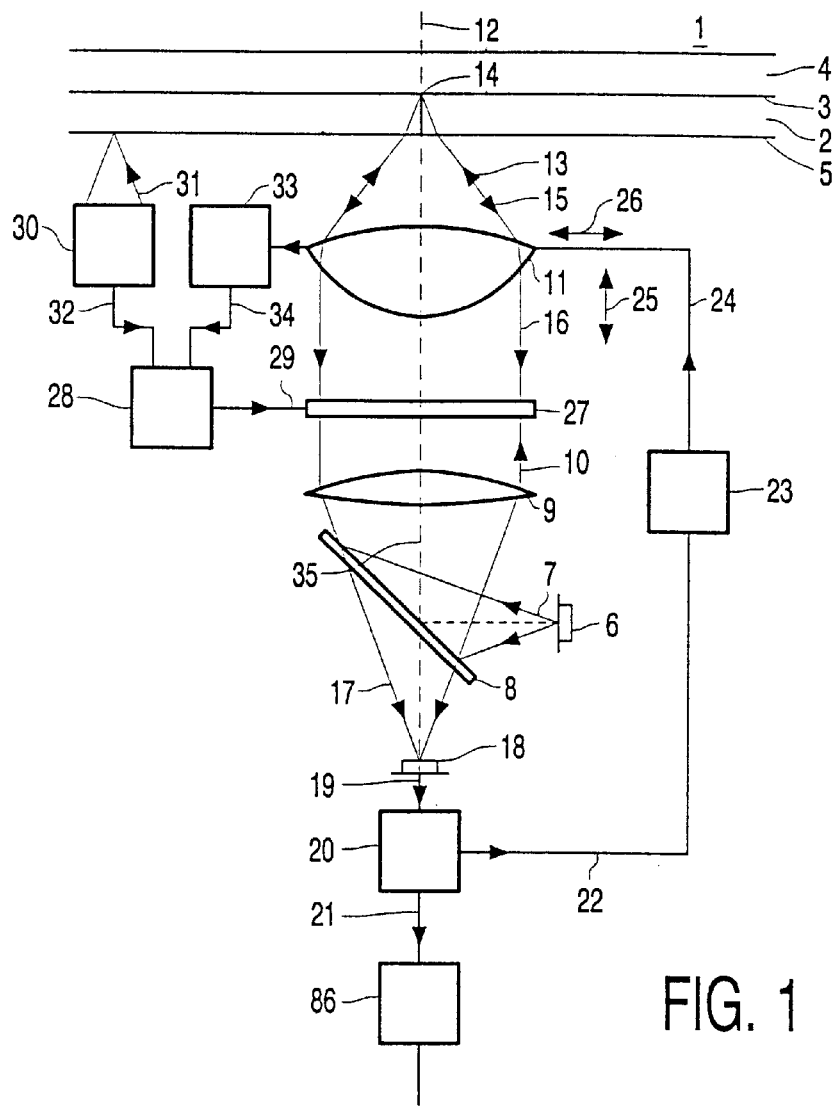

FIG. 1 shows a device for scanning an optical record carrier 1. The record carrier comprises a transparent layer 2, on 1 side of which information layer 3 is arranged. The side of the information layer facing away from the transparent layer is protected from environmental influences by a protection layer 4. The side of the transparent layer facing the device is called the entrance face 5. The transparent layer 2 acts as a substrate for the record carrier by providing mechanical support for the information layer. Alternatively, the transparent layer may have the sole function of protecting the information layer, while the mechanical support is provided by a layer on the other side of the information layer, for instance by the protection layer 4 or by a further information layer and a transparent layer connected to the information layer 3. Information may be stored in the information layer 3 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetization different from their surroundings, or a combination of these forms.

The scanning device comprises a radiation source 6, for example a semiconductor laser, emitting a diverging radiation beam 7. A beam splitter 8, for example a semitransparent plate, reflects the radiation beam towards a collimator lens 9, which converts the diverging beam 7 into a collimated beam 10. The collimated beam 10 is incident on objective system 11. The objective system may comprise one or more lenses and/or a grating. The objective system 11 has an optical axis 12. The objective system 11 changes the collimated beam 10 to a converging beam 13, incident on the entrance face 5 of the record carrier 1. The converging beam 13 forms a spot 14 on the information layer 3. Radiation reflected by the information layer 3 forms a diverging beam 15, transformed into a collimated beam 16 by the objective system 11 and subsequently into a converging beam 17 by the collimator lens 9. The beam splitter 8 separates the forward and reflected beams by transmitting at least part of the converging beam 17 towards a detection system 18. The detection system captures the radiation and converts it into electrical output signals 19. A signal processor 20 converts these output signals to various other signals. One of the signals is an information signal 21, the value of which represents information read from the information layer 3. The information signal is processed by an information processing unit for error correction 86. Other signals from the signal processor 20 are the focus error signal and radial error signal 22. The focus error signal represents the axial difference in height between the spot 14 and the information layer 3. The radial error signal represents the distance in the plane of the information layer 3 between the spot 14 and the centre of a track in the information layer to be followed by the spot. The focus error signal and the radial error signal are fed into a servo circuit 23, which converts these signals to servo control signals 24 for controlling a focus actuator and a radial actuator respectively. The actuators are not shown in the Figure. The focus actuator controls the position of the objective system 11 in the focus direction 25, thereby controlling the actual position of the spot 14 such that it coincides substantially with the plane of the information layer 3. The radial actuator controls the position of the objective lens 11 in a radial direction 26, thereby controlling the radial position of the spot 14 such that it coincides substantially with the central line of track to be followed in the information layer 3. The tracks in the Figure run in a direction perpendicular to the plane of the Figure.

The scanning device of FIG. 1 has a relatively large tolerance range for tilt of the optical record carrier 1. It thereto determines the aberration caused by the tilted record carrier in the converging beam 13, and compensates the aberration by introducing a wavefront distortion in the collimated beam 10. The wavefront distortion is introduced by a wavefront modifier operating as an aberration compensator 27 arranged in the collimated beam 10. A control circuit 28 controls the wavefront distortion via control signals 29. The value of the aberration to be compensated is determined by an aberration detector, which, in this embodiment, is a tilt detector 30. The tilt detector emits a radiation beam 31 towards the optical record carrier 1 and detects the angle of the beam reflected by the record carrier. The position of the spot of the reflected beam is a measure for the angle and, hence, for the tilt of the record carrier. The measured tilt is directly proportional to the coma in the converging beam 13. Hence, the tilt signal 32, i.e. the output signal of the tilt detector 30, can be used directly as input for the control circuit 28, thereby controlling the amount of coma introduced by the aberration compensator 27.

The tilt detector 30 may be of any type. The tilt signal may also be derived from a combination of detector output signals 19. In that case the tilt detector forms part of the control circuit 28.

Figure 2:
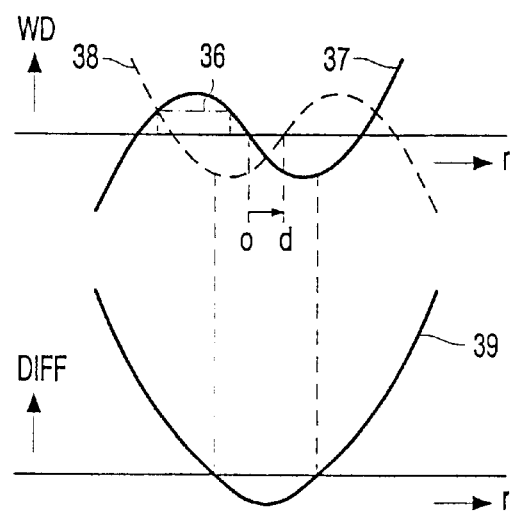
FIG. 2 shows two laterally displaced comatic wavefront distortions WD and the difference DIFF between them as a function of radial position r in the radiation beam.

The wavefront distortion introduced by the aberration compensator 27 will only compensate the aberration introduced by the tilted record carrier if the introduced aberration is correctly centred with respect to the objective system 11. The compensation is not correct anymore, if the introduced aberration is centred on the axis of collimated beam 10 and the objective system is displaced in a radial direction 26 because of radial tracking. The effect of this displacement is shown in FIG. 2, giving wavefronts in that radial cross-section of the radiation beam in which the objective system 11 has its radial displacement d. The displacement d is normalised on the radius of the entrance pupil of the objective system. Drawn curve 37 represents a comatic wavefront distortion WD, centred on the optical axis of the radiation beam 10 at r=0 and introduced by the aberration compensator 27. The dashed line 38 represents the comatic wavefront distortion to be compensated and caused by the tilted optical record carrier 1, and displaced from the optical axis by a distance d due to a displacement of the objective system 11. It is clear from the Figure that, when the displacement d is zero, the introduced aberration 37 will perfectly cancel the aberration 38, thereby providing a spot 14 on the information layer 3 of the record carrier 1 of high quality. When the displacement d is not equal to zero, the wavefronts 37 and 38 will not cancel each other, thus causing an imperfect compensation. The resulting wavefront error DIFF is the difference between curves 37 and 38, shown in FIG. 2 as line 39. For small displacements d, the difference 39 is proportional to the derivative of line 37 with respect to the co-ordinate in the direction of the displacement. The resulting wavefront error is one radial order lower than the wavefront WD, and in this case is astigmatism, the value of which is proportional to the displacement d and the amount of coma to be compensated. This astigmatism must also be compensated by the aberration compensator 27. A more detailed analysis of the wavefront errors shows, that a decentred comatic wavefront not only introduces astigmatism but also a small amount of wavefront tilt and defocus. The wavefront tilt and defocus will be corrected automatically by the radial and focus servo respectively.

The measurement of the position of the objective system 11 in the radial direction 26, required as input for the aberration compensation, is performed by a position detector 33 as shown in FIG. 1. A position signal 34 generated by the position detector is used as input for the control circuit 28. The position of the objective system 11 may be measured using any known position measuring method. An optical method is preferred, because it does not affect the mechanical properties of the objective system. The position may also be derived from the detector output signals 19, as is known inter alia from U.S. Pat. No. 5,173,598 (PHN 13695). In that case the position detector forms a part of the signal processor 20.

Figure 3:
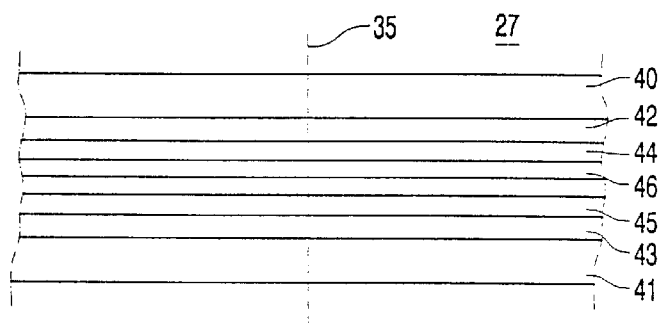
FIG. 3 shows a cross-section of an aberration compensator in the form of a liquid crystal cell.

FIG. 3 shows an embodiment of the aberration compensator, in the form of a liquid crystal cell. The cell comprises two plane parallel transparent plates 40 en 41, made of for instance glass. On the inner sides of the transparent plates transparent electrode layers 42 and 43 are arranged. The inner sides of the electrode layers are covered with alignment layers 44 and 45 respectively. A nematic liquid crystal material 46 is arranged between the two alignment layers. The liquid crystal material may be replaced by a ferro-electric medium, when higher switching speeds are required. The electrode layer comprises transparent conductors, made of for instance indium tin oxide. The refractive index of the liquid crystal material is controlled by the voltage difference between the electrode layers 42 and 43. Since the refractive index determines the optical path length through the liquid crystal layer 46, a temporal and/or spatial variation of the voltage difference can be used to change the wavefront of a radiation beam passing through the aberration compensator. Although the Figure shows a medium in the form of a flat liquid crystal layer, the medium may be curved. The thickness of the medium may vary as a function of position in the cross-section of the radiation beam, thereby reducing the requirements imposed on the control voltages.

Figure 4B:
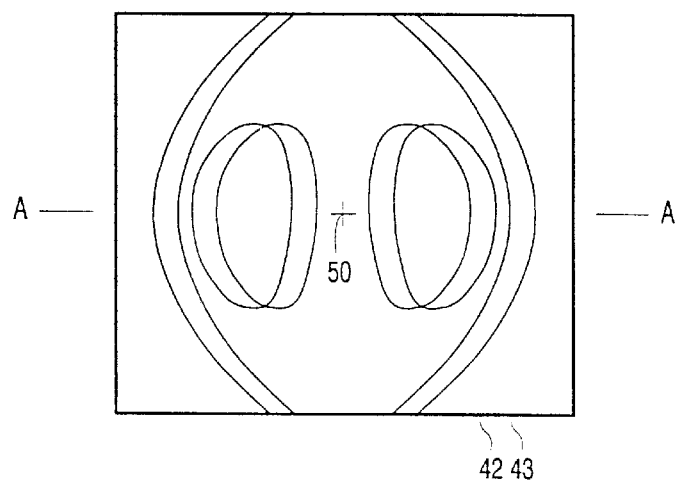
FIG. 4B shows two superposed electrode configurations for introducing decentred coma.

FIG. 4A shows the electrode structures in electrode layer 42 and 43. These electrode structures are adapted to introduce off-centre coma in the radiation beam. The electrode structures comprise various electrodes in the form of electrically conducting transparent regions separated by small non-conducting intermediate regions, not shown in the Figure. The electrode layer 42 comprises electrodes 51 to 55. Similarly, the electrode layer 43 comprises electrodes 56 to 60. The Figure shows a plan view of the electrode layers 42 and 43. The intersection of the optical axis 35 of collimated beam 10 with the electrode layers is indicated by the cross 50. The electrode structure is adapted to introduce a comatic wave front aberration in the radiation beam passing through the liquid crystal cell in the form of the Zernike polynomial $(3r^3-2r) \cos \theta$, where r–θ are the polar co-ordinates in the cross-section of the radiation beam. The angle θ is zero along the horizontal direction in the Figure, from the cross 50 towards electrode 54. The width and position of electrode 54 is indicated by the dot and dash line 36 in FIG. 2. The width is chosen such that the electrode 54 covers those regions of the aberration compensator where the value of the Zernike polynomial $(3r^3-2r) \cos \theta$ is larger than a predetermined value 'a'. In practice, 'a' has a value between 0.1 and 0.35, and preferably has a value approximately equal to 0.25. The same applies to the other electrodes. The electrode structure in layer 42 is offset in the left direction with respect to the centre 50. The electrode structure in the electrode layer 43 is offset to the right with respect to the centre 50. The amount of offset is determined by the maximum displacement of the objective system 11. FIG. 4B shows a plan view of both electrode layers 42 and 43 superposed. The offset of the electrode structures is in the radial direction 26 as indicated in FIG. 1.

Figure 5:
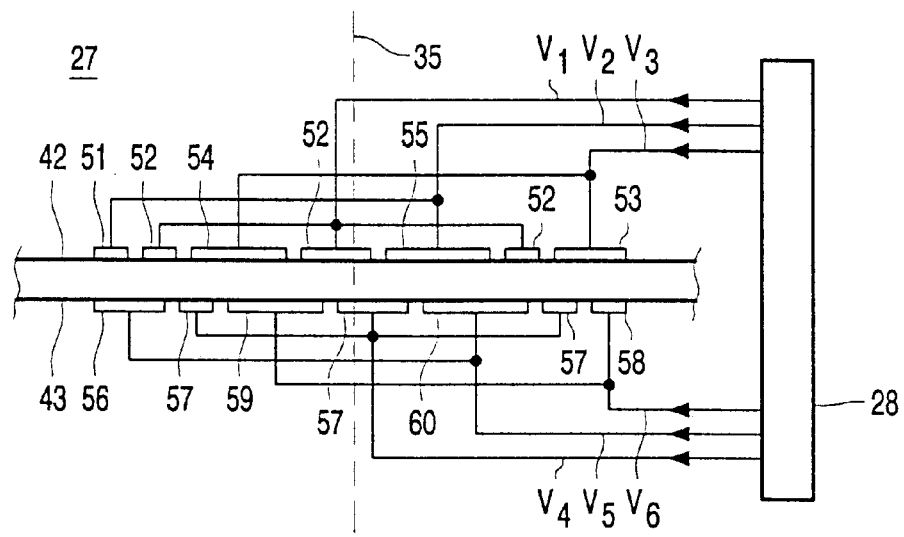
FIG. 5 shows electrical connections between the electrode configurations of FIG. 4A and a control circuit.

FIG. 5 shows a cross-section of the electrode layers 42 and 43, where the conductive regions are shown separated from one another. The electrode 51 and 55 are electrically connected, likewise electrodes 53 and 54, 56 and 60, 58 and 59 are pairwise electrically connected. These electrical connections may be made outside the electrode layers or in the electrode layers by means of small transparent conductive strips. Although the three regions 52 in FIG. 5 are connected in the layer as indicated by FIG. 4A, FIG. 5 also shows an external connection of the three regions for clarity's sake only. The cross-section of FIG. 5 is along line A—A shown in FIG. 4B. The control circuit 28 provides the control signals 29, six of which are indicated in FIG. 5 by $V_1$ to $V_6$. Control signal $V_1$ is applied to electrode 52, $V_2$ to electrodes 51 and 55 and $V_3$ to electrodes 54 and 53. Likewise control signal $V_4$ is connected to electrodes 57, control signal $V_5$ to electrodes 56 and 60 and $V_6$ to electrodes 59 and 58.

The aberration compensator 27 may be controlled by applying various DC voltages to its electrodes. However, it is preferred to use AC voltages for the control in view of the stable operation of the liquid crystal. FIG. 6A shows an embodiment of the control circuit 28, providing the required AC control voltages. The tilt signal 32 is used as input for a voltage-to-voltage converter 61, which provides at its output a first control signal 62, having value $\Delta V$, dependent on the tilt signal 32. The first control signal 62 is connected to an adder 63. A voltage source 63 provides a reference voltage $V_0$ to the adder 63. The adder has three output signals $D_1$, $D_2$ and $D_3$, the values of which are $V_0$, $V_0+\Delta V$, $V_0-\Delta V$, respectively. The three output signals $D_1-D_3$ are used as input for a multiplier 64. A square-wave generator 64' provides a square wave signal, having a fixed amplitude and a predetermined frequency, preferably lying in the range between 1 and 10 kHz. This square wave signal is used as input for the multiplier 64. The multiplier provides three AC control signals, $A_1$, $A_2$ and $A_3$, as output signals. Each of the three output signals has a square-wave form and a zero average value. The peak-peak amplitude of signal $A_1$ is equal to $V_0$, that of signal $A_2$ is equal to $V_0+\Delta V$, that of signal $A_3$ is equal to $V_0-\Delta V$. The sign and magnitude of the control signals $A_1-A_3$ are such that, when applied to the aberration compensator 27, the correct amount of coma is introduced in the collimated beam 10 to compensate the coma caused by the amount of tilt of the optical record carrier 1 as represented by the tilt signal 32. Thereto, the value of $\Delta V$ is proportional to the value of the tilt signal. The control signals $A_1$, $A_2$ and $A_3$ are connected to six change-over switches 65, which have the signal $V_1$ to $V_6$ as output signals. The six output signals $V_1$ to $V_6$ can be switched between the control signal $A_1$, $A_2$ or $A_3$ and ground. The switches 65 are controlled by a switch control circuit 66, which has the position signal 34 as input. When the position signal is positive, the six switches 65 are in the positions as shown in FIG. 6A. When the position signal is negative, the six switches are in their other positions. Hence, in the drawn position of the switches, the electrodes 56–60 are all connected to the ground, and varying voltages are applied to the electrodes 51–55, such that a comatic wavefront aberration is introduced which is offset to the left hand side in FIG. 5 with respect to the optical axis 35. When the sign of the position signal 34 reverses, the electrodes 51–55 are connected to the ground, and the varying voltages are applied to the electrodes 56–60. The resulting comatic wavefront aberration is off centre to the right hand side with respect to axis 35. The value of the predetermined voltage $V_0$ depends on the properties of the aberration compensator 27, in particular the liquid crystal material, and is chosen such that the response of the compensator is proportional to $\Delta V$.

Figure 6B:
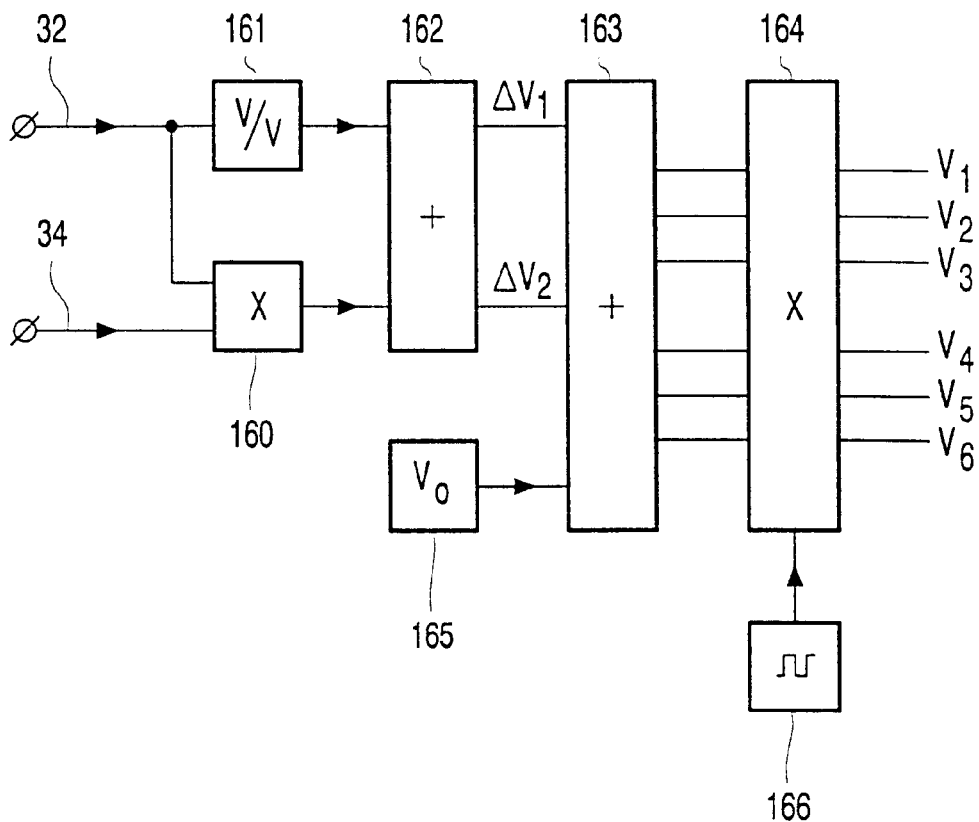

FIG. 6B shows an alternative embodiment of the control circuit 28. The tilt signal 32 is used as input for a voltage-to-voltage converter 161, which provides at its output a first control signal having a value $\frac{1}{2}\Delta V$, proportional to the amount of tilt. The tilt signal 32 and the position signal 34 are used as input for a multiplier 160, which provides at its output a second control signal having a value of $\frac{1}{2}(x/x_0)\Delta V$, where x is proportional to the displacement of the objective system and $x_0$ is the maximum displacement of the objective system. The first and second control signal are fed into an adder 162, forming two output signals $\Delta V_1=\frac{1}{2}\Delta V-\frac{1}{2}(x/x_0)\Delta V$ and $\Delta V_2=\frac{1}{2}\Delta V+\frac{1}{2}(x/x_0)\Delta V$. A voltage source 165 provides a reference voltage $V_0$ to an adder 163. The adder also has the signals $\Delta V_1$ and $\Delta V_2$ as inputs and forms five signals having the values $V_0$, $V_0-\Delta V_1$, $V_0+\Delta V_1$, $V_0-\Delta V_2$ and $V_0+\Delta V_2$. A square-wave generator 166 provides a square wave signal, having a fixed amplitude and a predetermined frequency, preferably lying in the range between 1 and 10 kHz. The square wave signal and the five signals are used as input for a multiplier 164. The multiplier provides six AC control signals $V_1$ to $V_6$, which are connected to the aberration compensator 27. Each of the AC control signals has a square-wave form and a zero average value. The peak-peak amplitude of the signals $V_1$ to $V_6$ is $V_0$, $V_0-\Delta V_1$, $V_0+\Delta V_1$, $V_0$, $V_0-\Delta V_2$ and $V_0+\Delta V_2$, respectively. The signals $V_1$, $V_2$ and $V_3$ have the same phase; likewise $V_4$, $V_5$ and $V_6$. The two groups of signals may have the same phase or may be mutually 180° out of phase. The amplitudes of $V_0$, $\Delta V_1$ and $\Delta V_2$ depend on the properties or the aberration compensator and the phase between the groups of signals, and are chosen such that the response of the compensator is proportional to $\Delta V_1$ and $\Delta V_2$.

A proper balancing of aberrations in this embodiment of the aberration compensator requires that the displacement between the two electrode structures in the electrode layers 42 and 43 is equal to approximately half the maximum peak-peak displacement of the objective system 11. If the maximum peak-peak displacement of the objective system is e.g. from −400 to +400 µm, the displacement between the electrode structures is preferably 400 µm.

The match between the wavefront aberration introduced by the aberration compensator 27 and the Zernike polynomial for coma may be improved by increasing the number of electrodes in the electrode layers 42 and 43. FIG. 7 shows an electrode configuration that can be used in the aberration compensator 27. The electrodes form a series of small strips with a small spacing, causing a smooth transition of the refractive index of the liquid crystal material under one electrode to the refractive index of the liquid crystal material under the neighbouring electrode. The reduction of the phase changes between electrodes reduces the higher order aberrations, even when the objective system 11 is positioned off-centre. The particular width of the electrodes of the embodiment, decreasing with increasing radius, as shown in FIG. 7 allows the electrodes to be controlled with a voltage that increases linearly with the strip of the electrode. If the 2N+1 strips are numbered consecutively with an index running as −N, −N+1, . . . 0, 1, . . . N, then the strip with index j covers that area in the (x,y) plane that comply with $$\frac{2j-1}{2N+1} < W_{31}(x, y) < \frac{2j+1}{2N+1}$$

$W_{31}(x,y)=(x^2+y^2)x$ is the Seidel polynomial for coma, and x,y are normalised co-ordinates in the cross-section of the radiation beam in the plane of the aberration compensator, where x is in the direction of displacement of the objective system. This electrode structure introduces a comatic wavefront aberration in the beam passing through the aberration compensator. The aberration is not of the Zernike type but of the Seidel type, which has the advantage of a simpler layout of the electrodes, each electrode having a connection outside the cross-section of the beam, and a simple scheme for the control voltages. The tilt and defocus, which are inherently introduced into the radiation beam 10 when using Seidel aberrations, will be compensated automatically by the focus and radial tracking servo of the device.

The electrode configuration 67 shown in FIG. 7 may be used in both electrode layers 42 and 43, and displaced with respect to one another as indicated in FIG. 4B. The control of the voltages of the electrodes in the two electrode layers can be carried out by a control circuit similar to the one shown in FIGS. 6A and B. In an alternative embodiment, the electrode configuration 67 is arranged in electrode layer 42 and centred on the optical axis 35. The electrode layer 43 comprises a single electrode covering the entire cross-section of the radiation beam 10 and set at a fixed potential. When controlled by a voltage that increases linearly from one electrode to the next, the electrode configuration will give rise to centred comatic wavefront aberration. The astigmatism, required when the objective system 11 is off-centre, can be introduced by an asymmetric control of the electrodes as indicated in FIG. 8. FIG. 8 shows the voltage as a function of the electrode number, where electrode number zero is the central electrode of the electrode configuration, which is set at a voltage $V_0$. The drawn line 68 indicates the linearly increasing voltage for the generation of centred coma. The dashed line 69 indicates the voltages for simultaneously generating coma and astigmatism.

The electrode configuration 67 as shown in FIG. 7 requires a relatively large number of voltages to be generated by the control circuit 28. The number of voltages to be generated by the control circuit can be reduced, if the electrode configuration is provided with a series arrangement of resistors that forms the required voltages. FIG. 7 shows a series arrangement made up of resistors 70, the arrangement being provided with a central terminal 71 and two end-terminals 72 and 73. The three terminals 71, 72 and 73 allow both a control by a linear voltage indicated by drawn line 68 and by a voltage indicated by dashed line 69 in FIG. 8A. A more accurate control can be obtained if the number of terminals is increased. The voltages applied to end terminals 72 and 73 may be chosen asymmetrical with respect to the voltage $V_0$ on the central terminal 71. The voltage Vj on strip j can then be written as $$V_j = V_0 - p_\pm \frac{j}{N} \Delta V,$$

where $\Delta V$ is equal to $(V_{+N}-V_{-N})/2N$ if there is no displacement of the objective system. The asymmetry factor $p_+$ is used for $j \geq 0$ and $p_-$ for $j<0$ for one sign of the tilt signal; $p_-$ is used for $j \geq 0$ and $p_+$ for $j<0$ for the other sign of the tilt signal. The values of the factors depend on the displacement d as indicated in FIG. 8B, where the drawn line represents the values of $p_+$ and the dashed line those of $p_-$.

FIG. 9 shows an electrode configuration wherein the series arrangement of resistors is integrated in the conductive layer of the electrode layer. The embodiment has five electrodes 76–80 separated by small non-conductive strips. The three terminals 81, 82 and 83 are connected by four resistors 84, formed by strips of conductive layer, connected in series between the terminals. A high resistance can be obtained by decreasing the width of the strips that make up the resistors 84. Five taps 85 connect the resistors with the electrodes.

FIG. 10 shows an alternative embodiment of the electrode configuration of the aberration compensator 27. The configuration comprises a structure 88 for generation of coma, similar to the structure shown in FIG. 7. The individual strips of the structure 88 are connected by taps in the form of strips 89 to a resistor maze 90. The maze forms resistors of equal value between subsequent taps 89. The control voltages are applied to the configuration through terminals 91, 92 and 93. The extent of the maze may be reduced by arranging these strips of the maze in a zigzag structure. Alternatively, the strips of the maze may be arranged around the structure 88.

The resistor of the elements in the maze must be sufficiently large to ensure a tolerable low level of dissipations and sufficiently small to ensure an RC-time of the cell that is much smaller than the period of the AC-voltage.

The coma caused by tilt of the record carrier 1 may also be compensated by an aberration compensator that introduces centred coma and centred astigmatism. Thereto, the aberration compensator 27 is provided with electrode layer 42 having an electrode configuration for introducing centred coma, and electrode layer 43 having an electrode configuration for introducing centred astigmatism. The electrode configuration for centred coma is similar to the electrode configuration 42 shown in FIG. 4A but centred on the intersection 50 of optical axis 35. The centred coma may also be introduced by the electrode configuration 67 shown in FIG. 7.

FIG. 11 shows an electrode configuration 95 in electrode layer 43 for introducing centred astigmatism. The electrode pattern is centred on the optical axis 35. A circle 96 in the electrode configuration indicates the cross-section of the radiation beam in the plane of the configuration. The electrodes in both electrode layers may be confined to the area within the beam cross-section 96, or may extend outside the beam cross-section. The configuration 95 is adapted to introduce astigmatism in the Zernike form, which can be described as $Z_{22}=x^2-y^2$. The normalised co-ordinates x,y are indicated in the Figure. This Zernike form for astigmatism is particularly suitable for an aberration compensator which also introduces coma in the Seidel form. In its simplest form, the electrode configuration comprises a central electrode 97 and four side electrodes 98–101. The position of the border between the electrodes and the control voltages is determined as follows. The points in the configuration with $Z_{22}(x,y)>a$ are set at a voltage $V_{10}=V_0-\Delta V$. The points in the configuration with $-a<Z_{22}(x,y)<a$ are set at a voltage $V_{11}=V_0'$. The points in the configuration with $Z_{22}(x,y)<-a$ are set at a voltage $V_{12}=V_0'+\Delta V$. The voltage $\Delta V$ is proportional to the amount of astigmatism to be introduced. The value of the parameter a is preferably in the range from 0.10 to 0.60, and, more preferably, substantially equal to 0.25. The electrode configuration shown in FIG. 11 is based on a=0.25.

FIG. 12 shows a control circuit for the electrical control of an aberration compensator having both the electrode configuration 67 for introducing coma in the radiation beam passing through the compensator and the electrode configuration 95 for introducing astigmatism in the beam. The control circuit can also be used if the electrode configurations have both a Zernike layout or both a Seidel layout. The control of the coma configuration 67 is similar to the control shown in FIGS. 6A and B. Hence, voltage converter 105, first control signal 106, adder 107 and voltage source 108 are similar to the corresponding elements 61 to 64' in FIGS. 6A and B. The DC output signals $D_4$, $D_5$ and $D_6$ of adder 107 correspond to the output signals $D_1$, $D_2$ and $D_3$, respectively as shown in FIG. 6A. The control of the astigmatism configuration 95 uses the tilt signal 32 and the position 34 as input signals. A multiplier 109 forms the product of the two signals. The product is a measure for the astigmatism introduced into the radiation beam by the combination of a centred comatic aberration introduced by the wavefront compensator 27 and a displaced objective system 11. The product is output as a second control signal 110 and used as input for an adder 111. A voltage source 112 supplies a voltage $V_0'$ to the adder. The adder has three DC output signals $D_7$, $D_8$ and $D_9$, having the values $V_0'+\Delta V$, $V_0'$, $V_0'-\Delta V$ respectively, where $\Delta V$ is the value of the second control signal 110. The DC output signals $D_4$ to $D_9$ are connected to a multiplier 113, which forms output signals $V_7$ to $V_{12}$. A square-wave generator 114, similar to the square-wave generator 64' in FIG. 6A, supplies a square wave signal to the multiplier 113. The multiplier 113 multiplies each of the six input signals $D_4$ to $D_9$ with the square-wave signal, resulting in six square wave output signals $V_7$ to $V_{12}$, respectively, having the wave form of the output of the square-wave generator 114 and an amplitude corresponding to the signals $D_4$ to $D_9$. The output signals $V_7$, $V_8$ and $V_9$ are similar to the output signals $A_1$, $A_2$ and $A_3$, respectively, in FIG. 6A, and are connected to the terminals 71, 72 and 73, respectively, of the electrode configuration 67 shown in FIG. 7. The output voltage $V_{10}$ is connected to side electrodes 98 and 100 of electrode configuration 95 shown FIG. 11. The output voltage $V_{11}$ is connected to the central electrode 97, and the output voltage $V_{12}$ is connected to the side electrodes 99 and 101.

The aberration compensator 27 in the above described embodiments compensates coma caused by tilt of the record carrier 1, taking into account the position of the objective system 11. The position of the objective system can also be taken into account for compensators that introduce aberrations other than coma, for instance spherical aberration, caused for instance by variations in the thickness of the transparent layer 2 of the record carrier one. When an optical beam in which centred spherical aberration has been introduced, passes through a displaced objective system, the beam after passage through the objective system will suffer from coma which is linear in the displacement and astigmatism which is quadratic in the displacement of the objective system. The compensation of the spherical aberration can be corrected for the displacement of the objective system in a way similar to the correction in the above described embodiments of the aberration compensator. A first adapted embodiment of the aberration compensator comprises a first electrode layer having an electrode configuration for generating spherical aberration as shown in FIG. 13, the centre of which is displaced with respect to the intersection of the optical axis 35 with the electrode layer, and a second electrode layer having a similar electrode configuration for generating spherical aberration, but displaced in a direction opposite to the configuration in the first electrode layer. A second embodiment of the aberration compensator comprises a first electrode layer having an electrode configuration for generating a centred spherical aberration, and a second electrode layer having an electrode configuration for generating centred coma. The two electrode configurations may also be combined into a single electrode layer. A third embodiment of the aberration compensator comprises three electrode layers and two liquid crystal layers between them. One layer is provided with an electrode configuration for generating centred spherical aberration. A second layer is provided with a configuration for generating centred coma and a third layer with a configuration for generating centred astigmatism. The aberration compensator is controlled by the position signal 34 representing the position of the objective system and a signal representing the amount spherical aberration in the radiation beam returning from the record carrier. A sensor for measuring the spherical aberration in the radiation beam is described in the European Application having filing number 98204477.8 (PHN 17.266). The amount of spherical aberration may be predetermined and appropriate for the thickness of the transparent layer.

FIG. 13 shows a electrode configuration 116 for generating spherical aberration. The Zernike representation of the aberration is $Z_{40}=6(x^2+y^2)(x^2+y^2-1)+1$. The borders between the electrodes and the voltages applied to them can be derived as follows. The points in the configuration with $Z_{40}(x,y)>a$, i.e. the central area 117 and the ring 121, are set at a voltage $V_0-\Delta V$. The points in the configuration complying with $-a<Z_{40}(x,y)<a$, i.e. the rings 118 and 120, are set at a voltage $V_0$. The points in the pupil with $Z_{40}(x,y)<-a$, i.e. the ring 119, are set at a voltage $V_0+\Delta V$. The parameter 'a' is preferably in the range from 0.20 to 0.70. The electrode configuration shown in FIG. 13 is for $a=\sqrt{3}/4=0.433$. This value of a gives equal surface areas for the electrodes to which a voltage $V_0-\Delta V$ is applied and those to which $V_0+\Delta V$ is applied. The electrode configuration for generating spherical aberration may be simplified by forming three concentric rings and applying different voltages to them.

The electrode configurations for generating spherical aberration, coma and/or astigmatism may be combined into a single electrode configuration by a suitable division of the electrode layer into separate electrodes and a corresponding adaptation of the control circuit. The aberration compensator may comprise one electrode layer for introducing two aberrations, e.g. coma and astigmatism, and one electrode layer for introducing another aberration, e.g. spherical aberration.

The above embodiments of the wavefront modifier operate as aberration compensators. It will be clear, that the wavefront modifier can also be used to introduce a desired wavefront shape in a radiation beam without correcting an undesired wavefront shape. As an example, the modifier may introduce defocus as a first wavefront modification of the radiation beam and tilt as a second wavefront modification, correcting for a displacement of the radiation beam. Such a modifier may be used in a focus servo loop together with an objective lens being capable of axial movement, the modifier and the objective lens controlling the axial position of the focus spot in two different frequency ranges.

What is claimed is:

1. An optical wavefront modifier, comprising:

a first transparent electrode layer;

a second transparent electrode layer; and a medium positioned between the electrode layers, for modifying the wavefront of an optical beam passing through the medium depending on electrical excitation of the medium by the electrode layers, the beam having a cross-section in the plane of the medium;

and wherein the electrode layers provide the electrical excitation of the same medium to produce a first wavefront modification of a first order of a radius in the cross-section and simultaneously a second wavefront modification of a second order of the radius different from the first order.

2. The modifier of claim 1, wherein the first electrode layer provides the electrical excitation of the medium to produce the first wavefront modification of the first order and the second electrode layer provides the electrical excitation of the medium to produce the second wavefront modification of the second different order.

3. The modifier of claim 1, wherein the first electrode layer has an electrode configuration for providing the electrical excitation of the medium to produce both the first wavefront modification of the first order and the second wavefront modification of the second different order.

4. The modifier of claim 1, wherein the second order is one order lower than the first order.

5. The modifier of claim 4, wherein the first wavefront modification corresponds to coma and the second wavefront modification corresponds to astigmatism.

6. The modifier of claim 4, wherein the first wavefront modification corresponds to spherical aberration and the second wavefront modification corresponds to coma.

7. The modifier of claim 1, wherein the first wavefront modification of the first order and the second wavefront modification of the different second order are orthogonal over the cross-section of the beam.

8. The modifier of claim 1 in which the electrical excitation is provided by a configuration of the first and/or second electrode layers.

9. A device for scanning an optical record carrier having an information layer, comprising:
   a radiation source for generating a radiation beam;
   an objective system for converging the radiation beam to a focus on the information layer;
   a detection system for intercepting radiation from the record carrier; and
   an optical wavefront modifier arranged in the optical path between the radiation source and the detection system, and including:
   a first transparent electrode layer;
   a second transparent electrode layer; and
   a medium positioned between the electrode layers, for modifying the wavefront of an optical beam passing through the medium depending on electrical excitation of the medium by the electrode layers, the beam having a cross-section in the plane of the medium;
   and wherein the electrode layers provide the electrical excitation of the medium to produce a first wavefront modification of a first order of a radius in the cross-section and simultaneously a second wavefront modification of a second order of the radius different from the first order.

10. The device of claim 9, further comprising an information processing unit for error correction of an information signal derived from an output of the detection system.

11. The modifier of claim 9, wherein the first electrode layer provides the electrical excitation to produce the first wavefront modification of the first order and the second electrode layer provides the electrical excitation to produce the second wavefront modification of the different second order.

12. The modifier of claim 9, wherein the first electrode layer has a configuration for providing both the electrical excitation to produce the first wavefront modification of the first order and the electrical excitation to produce the second wavefront modification of the second order.

13. The modifier of claim 9, wherein the second order is one order lower than the first order.

14. The modifier of claim 13, wherein the first wavefront modification corresponds to coma and the second wavefront modification corresponds to astigmatism.

15. The modifier of claim 13, wherein the first wavefront modification corresponds to spherical aberration and the second wavefront modification corresponds to coma.

16. The modifier of claim 9, wherein the first wavefront modification and the second wavefront modification are orthogonal over the cross-section of the beam.

17. The modifier of claim 9, wherein the electrical excitation is provided by a configuration of the first and/or second electrode layers.

18. An optical wavefront modifier, comprising:
   a first transparent electrode layer;
   a second transparent electrode layer; and
   a medium positioned between the electrode layers, for modifying the wavefront of an optical beam passing through the medium depending on electrical excitation of the medium by the electrode layers, the beam having a cross-section in the plane of the medium;
   and wherein:
   the electrode layers provide the electrical excitation of the medium to produce a first wavefront modification of a first order of a radius in the cross-section and simultaneously a second wavefront modification of a second order of the radius different from the first order; and
   the first electrode layer has an electrode configuration for producing both the first wavefront modification and the second wavefront modification.

19. A device for scanning an optical record carrier having an information layer, comprising:
   a radiation source for generating a radiation beam;
   an objective system for converging the radiation beam to a focus on the information layer;
   a detection system for intercepting radiation from the record carrier; and
   an optical wavefront modifier arranged in the optical path between the radiation source and the detection system, and including:
   a first transparent electrode layer;
   a second transparent electrode layer; and
   a medium positioned between the electrode layers, for modifying the wavefront of an optical beam passing through the medium depending on electrical excitation of the medium by the electrode layers, the beam having a cross-section in the plane of the medium;
   and wherein:
   the electrode layers provide the electrical excitation of the medium to produce a first wavefront modification of a first order of a radius in the cross-section and simultaneously a second wavefront modification of a second order of the radius different from the first order; and
   the first electrode layer has an electrode configuration for producing both the first wavefront modification and the second wavefront modification.

* * * * *